United States Patent [19]
Jung

[11] 3,895,174
[45] July 15, 1975

[54] METHOD AND APPARATUS FOR CONVERSION OF CRYSTALLINE SILICA RAW MATERIALS INTO AMORPHOUS SILICA

[76] Inventor: Lothar Jung, 31 Lurline Dr., Millington, N.J. 07946

[22] Filed: June 4, 1974

[21] Appl. No.: 476,220

[52] U.S. Cl. .................................. 13/21; 13/25
[51] Int. Cl. ........................ C03b 5/02; H05b 3/00
[58] Field of Search .............. 13/1, 10, 20, 21, 25; 219/388, 389

[56] References Cited
UNITED STATES PATENTS

| | | | |
|---|---|---|---|
| 2,936,505 | 5/1960 | Witucki et al. | 13/21 X |
| 3,394,242 | 7/1968 | King | 13/10 X |
| 3,802,847 | 4/1974 | Hara et al. | 13/21 X |

*Primary Examiner*—R. N. Envall, Jr.
*Attorney, Agent, or Firm*—Lane, Aitken, Dunner & Ziems

[57] ABSTRACT

The apparatus is a rotatable resistance heating furnace including a rotatable cylindrical body portion having an interior space in the form of a truncated cone. The base of the truncated cone forms a discharge opening for rapid discharge of the amorphous silica. The furnace is provided with a resistance heating element which extends into the furnace interior through a top opening. In one embodiment a slidable filling tube is provided for charging the furnace during rotation thereof. The process utilizes the above-described apparatus and involves heating the crystalline silica to a temperature sufficient to convert it to the amorphous state, evacuating the furnace during the conversion to draw off by-product gases, and rotating the furnace to a speed sufficient to bring about a separation between the silica charge and the resistance heating element.

5 Claims, 9 Drawing Figures

3,895,174

METHOD AND APPARATUS FOR CONVERSION OF CRYSTALLINE SILICA RAW MATERIALS INTO AMORPHOUS SILICA

BACKGROUND OF THE INVENTION

The present invention relates to a method and apparatus for the conversion of crystalline silica into amorphous silica.

Amorphous silica is widely used to form, usually by slip-casting methods, various refractory bodies and articles for high temperature applications in the chemical and metalurgical industries. Because the coefficient of linear expansion of cristobalite differs significantly from that of amorphous silica, the presence of significant amounts of cristobalite in the finished refractory products will render those products unsuitable for use in high temperature applications. Significant amounts of cristobalite within the articles will cause them to crack apart when subjected to high temperatures.

It is well known in the art that any and all crystalline forms of silica are converted into the amorphous state when heated above 1728°C, the melting point of cristobalite. The prior art has commonly employed electrical arc furnaces to produce the thermal energy required for the fusion and conversion of the crystalline silica. However, the electrical arc furnace is known to produce temperatures much higher than those required for fusion of silica and therefore consumes more energy than required for conversion. In addition to the thermal losses associated with the electric arc processes, superheating of the silica charge results in a high rate of consumption of the carbon or graphite electrodes and a loss of significant amounts of silica through vaporization. Another drawback of the prior art arc melting process resides in the production of gaseous byproducts which are formed within the furnace as a function of the temperature and degree of super-heat of the carbon electrodes and silica charge. The unwanted by-product reactions include those resulting in the formation of silicon carbide and the very toxic gas carbon monoxide. The prior art apparatus and process allow varying amounts of carbon monoxide to escape from the furnace, thus presenting a safety hazard and an environmental problem. Silicon carbide also forms in a gaseous phase reaction but tends to crystallize on the carbon or graphite electrodes, if the electrodes are freely suspended above the melt.

Still another drawback of the prior art technology results from direct contact between the hot fused silica and the heated carbon or graphite electrodes. Such direct contact results in the formation of silicon carbide which tends to disassociate at the surface of the electrodes resulting in the formation of silicon vapor and carbon monoxide gas. The direct contact between the hot fused silica and the electrodes also results in contamination of the fused silica product by carbon, silicon carbide, or even silicon. The contamination of the fused silica tends to turn its color from white into gray, brown or black. Since the contaminated silica is not acceptable for many end use applications, a physical separation of the contaminated products from the uncontaminated is necessary.

The prior art apparatus and process employing silica sand as a refractory material, surrounding the melt, encounter further difficulties. The prior art technique for insulating the melt results in the adherence of unfused silica sand and layers of cristobalite to the converted product. The skin must be removed prior to any further processing since it represents an unwanted contaminating material. Furthermore, the thermal conductivity, particularly the radiation conductivity of fused silica and crystalline silica, is comparatively high at temperatures near the melting point of cristobalite, leading to significant losses of thermal energy.

In devices wherein the resistance elements run through the furnace, with terminal ends located at each end of the furance housing, considerable thermal losses were found to occur because of the inevitable flow of heat from the resistance heating element or electrode into the connectors. In addition to such thermal losses, losses of electrical power were encountered as a result of the increase of the reactance of the furnace circuit with the introduction of an appreciable self-inductance as a result of looping the power feed lines.

Rotatable resistance furnaces, such as that disclosed in U.S. Pat. No. 2,936,505 issued to Witucki et al, have been employed in other applications. However, such apparatus is unsuitable for the production of amorphous silica because it does not provide for rapid discharge and quenching of the hot product, which rapid discharging is necessary to minimize cristobalite formation during cooling of the product.

SUMMARY OF THE INVENTION

In accordance with the present invention, a novel technique for the production of amorphous silica is provided which avoids all the above-noted problems and which produces amorphous silica of a high degree of purity with a minimum amount of power consumption and with provision for controlling the amount of toxic byproducts produced and further provision for collecting such gaseous byproducts.

The apparatus of the present invention includes a generally cylindrical furnace housing mounted for rotation about a central axis. The furnace housing defines an interior cavity having the shape of a truncated cone with a bottom opening at the base of the cone for discharging the contents of the furnace. Means is provided for introducing particulate crystalline silica into the interior of the furnace and for insertion of a resistance heating element. A cover plate is provided for closing and sealing the discharge opening and is designed to allow rapid discharge of the furnace contents.

In one embodiment the furnace is provided with a silica charging means in the form of a slidably mounted tube which may be inserted to the bottom of the furnace and gradually withdrawn during the filling operation so that a layer of crystalline silica may be evenly distributed over the vertical wall of the rotating furnace.

In a preferred embodiment, the apparatus of the present invention is additionally provided with means for evacuating the furnace interior.

In another embodiment a portion of the furnace housing is provided with a jacket adapted for circulation of a heat exchange medium which may be utilized to recover a portion of the heat generated within the furnace.

The process of the present invention utilizes the above-described apparatus and involves charging the furnace with the particulate crystalline silica and heating the silica charge to a temperature sufficient to melt and convert the silica to the amorphous state. The furnace interior is evacuated during the conversion process to draw off gaseous byproducts and thereby prevent contamination of the silica product. During the conversion process the furnace is rotated at a speed sufficient to cause the silica to be forced against the furnace wall, spaced from the carbon electrode. After conversion, the silica product is discharged through the bottom opening provided in the furnace.

In a preferred embodiment, the converted silica is cooled sufficiently within the furnace so that it will retain its shape upon discharge but is not allowed to cool to temperatures within the range where the rate of formation of cristobalite is the greatest.

Start-up of the furnace may be conveniently accomplished by following either of two procedures. In a first method the silica charge is heated to its melting point to induce volumetric contraction which results in the silica charge separating from the central carbon electrode. In this first method rotation of the furnace body is started only after such separation has been effected. In a second method, rotation of the furnace body is commenced prior to the filling operation and filling is accomplished through an axially movable filling tube which is initially inserted to a point near the bottom of the furnace and gradually withdrawn during filling so as to deposit a layer of silica along the rotating vertical interior wall of the furnace.

Accordingly, it is an object of the present invention to produce an amorphous silica product containing reduced amounts of cristobalite.

It is a further purpose of the present invention to provide an apparatus for the production of amorphous silica containing minimal amounts of cristobalite.

It is a further objective of the present invention to minimize and remove gaseous byproducts resulting from the conversion of crystalline silica to amorphous silica in a furnace containing a carbon electrode.

It is yet another object of the present invention to provide a technique and apparatus for the conversion of crystalline silica to amorphous silica with a minimum amount of energy consumption.

It is still another object of the present invention to improve the working environment by removal and containment of the toxic gaseous byproducts associated with such a conversion process.

Yet another object of the present invention is to provide for conversion of the silica charge in such a manner as to avoid a large temperature gradient across the thickness of the charge and thereby minimize wasteful superheat.

Another object is to prolong the life of the carbon or graphite electrodes used in such a process and apparatus.

Still another object of the present invention is to provide means whereby the silica charge can be maintained physically separated from the carbon or graphite electrodes during conversion to the amorphous state and thereby avoid electrode wear and contamination of the silica product.

Other objects and further scope of applicability of the present invention will become apparent from a reading of the detailed description to follow, taken in conjunction with the accompanying drawings.

DESCRIPTION OF THE PREFERRED EMBODIMENTS

Figure 4:
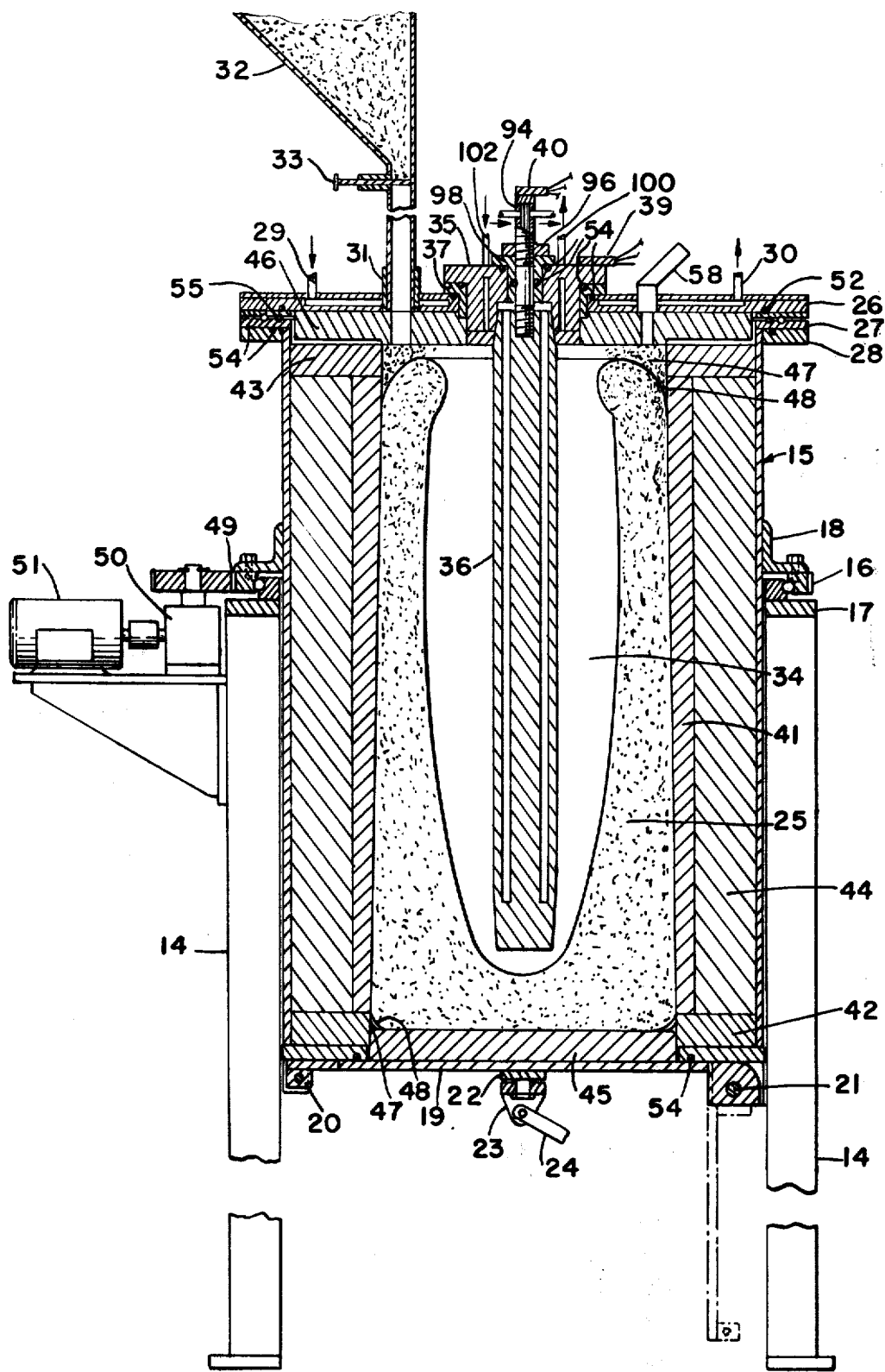
FIG. 4 is an elevational view, in cross-section, of the apparatus of the present invention showing a silica melt contained therein and crystalline silica feed stored in a feed hopper.

One embodiment of the apparatus of the present invention is illustrated in FIG. 4. In FIG. 4 is shown a vertically-mounted rotatable cylindrical furnace housing 15 supported by a stationary frame which includes a plurality of vertical support legs 14. Rotatable support of the furnace housing 15 is provided by means of a roller thrust bearing 16 which is mounted between circumferential mounting collars 17 and 18. Mounting collar 17 is integral with the support frame and remains stationary. Mounting collar 18 is rigidly affixed around the circumference of the rotatable cylindrical furnace housing 15.

The bottom of furnace 15 is closed by cover means or hinge plate 19 which is held in the closed position by locking means 20. Mounting means or hinge member 21 provides for movement of the cover means 19 between open and closed positions.

The top of the cylindrical housing 15 is closed by an upper cover means or stationary plate 26. Stationary plate 26 is supported by roller bearing 27 which is in turn rigidly affixed to flange 28 which represents the upper terminal surface of the furnace housing 15. The top plate 26 is a hollow construction to allow for circulation of a heat exchange medium which enters at port 29 and exits at a second port 30. Circulation of a heat exchange medium through plate 26 allows at least a portion of the heat from the furnace to be conserved for reuse.

The top plate 26 is provided with means for charging particulate crystalline silica into the furnace interior. The charging means includes an opening 21 in the top closure 26, a feed hopper 32 for storing the raw material and a shut-off valve 33 which may be operated to prevent further filling after fusion of the initial charge. Fusion of the initial charge results in a shrinkage of that mass as the void space between the particulate material diminishes with melting.

Figure 6:
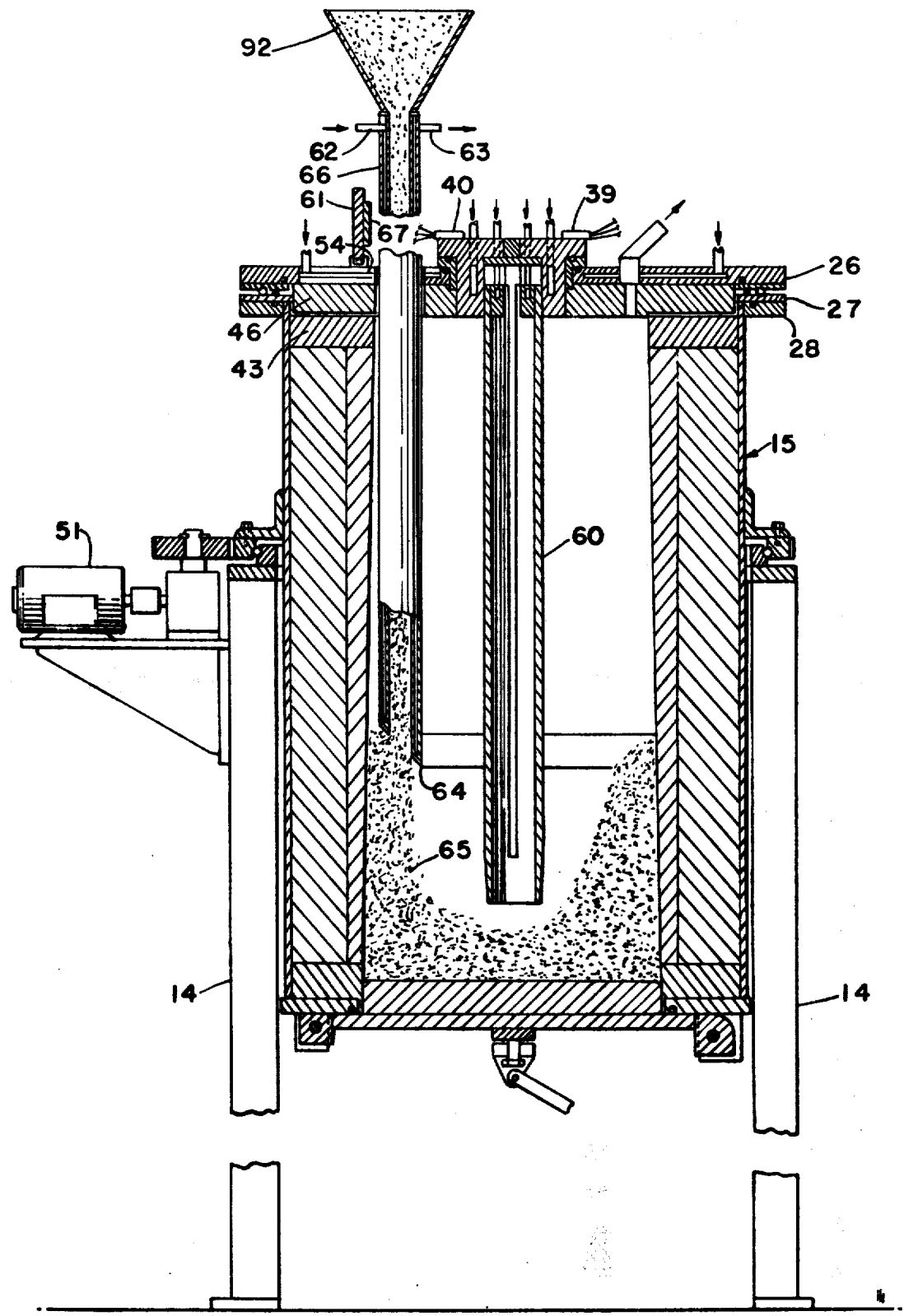
FIG. 6 is an elevational view, in cross-section, of another embodiment of the apparatus of the present invention having a slidable filling tube and depicts the procedure for filling the furnace using such means.

In an alternate embodiment, depicted in FIG. 6, means for filling during rotation of the furnace housing is provided. Filling means of the embodiment shown in FIG. 6 includes a water-jacketed filling tube 66 integrally connected to a feed hopper 92. The filling tube 66 is slideably mounted within the top plate member 54. Cooling water enters through port 62 and exits through port 63 to cool and protect the filling tube during operation of the furnace. The filling tube 66 is profiled or cut away at its lower end 64 to guide the discharge of the silica raw material in a preferred direction. A cover member 61 is rotatably mounted on the top of the stationary plate 64 to seal off the port provided for the filling tube after removal of the filling tube upon completion of the filling operation. A suitable insulating body 67 is provided on the interior surface of cover member 61 to protect cover 61 from the furnace heat when in the closed position.

Returning to FIG. 4, a central opening in the top plate 26 is provided for insertion of the electrode or return resistance element 36. The return element 36 is secured within the central opening of the top plate 26 by means of a threaded connector 94, a threaded retainer or bolt 96 and bushing members 35, 37, and 98. Bushing member 35 is an electrical connector which surrounds the upper end portion of the electrode 36 and is insulated from the metallic plate member 26 by means of the bushing or annular insulating spacer 37. Electrical connector 35 is likewise insulated from the threaded connector 94 by means of a second bushing or insulating member 98. The electrical connector 35 is also a hollow construction to permit circulation of cooling water which enters and exits through ports 100 and 102. Terminals 39 and 40, mounted on the electrical connector 35 and threaded connector 94, respectively, are connected to a power source (not shown) which provides the electrical energy necessary to effect heating and fusion of the silica raw material.

Figure 1:
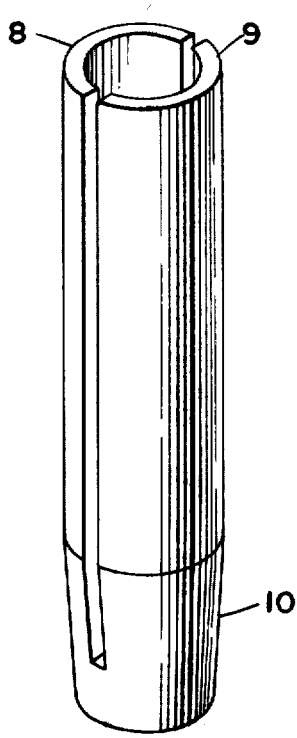
FIG. 1 is a perspective view of one type of electrode, in the form of a split tube, suitable for use in the present invention.
Figure 2:
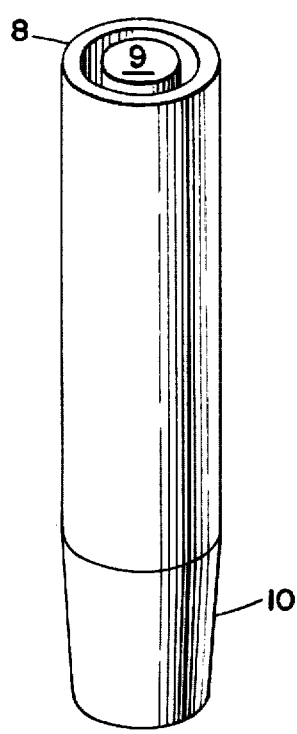
FIG. 2 is a perspective view of another type of return resistance element suitable for use in the present invention.
Figure 1A:
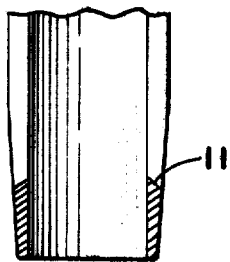
FIG. 1a is a partial elevation, in cross-section, of the lower end of the electrode or return resistance element shown in FIG. 1.
Figure 2A:
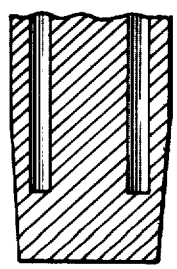
FIG. 2a is a partial elevation of the lower end of the electrode as shown in FIG. 2.

The return resistance element 36 shown in FIG. 4 corresponds to the design of the elemment shown in FIG. 2 and FIG. 2a. However, the element shown in FIG. 1 and FIG. 1a or that shown in FIG. 3 and FIG. 3a could also be employed in the apparatus depicted in FIG. 4. The return resistance element of FIG. 1 is in the form of a tube split in two down the length of a major portion of its vertical axis. The electrical power is connected to terminal points 8 and 9. The design of FIG. 1 may be modified for use in certain applications by varying the electrically conducting cross-section of the element in order to achieve a desirable temperature profile, such as by means of providing a tappered end portion 10. Surface 11 shown in FIG. 1a, is declined outwardly from the interior of the electrode in order to prevent the deposition of furnace charge material when installed in a vertical position. With reference to FIG. 2 and FIG. 2a, the wall portion 8 may be electrically connected to terminal 39 of the furnace and post 9 electrically connected to terminal 40.

Figure 3:
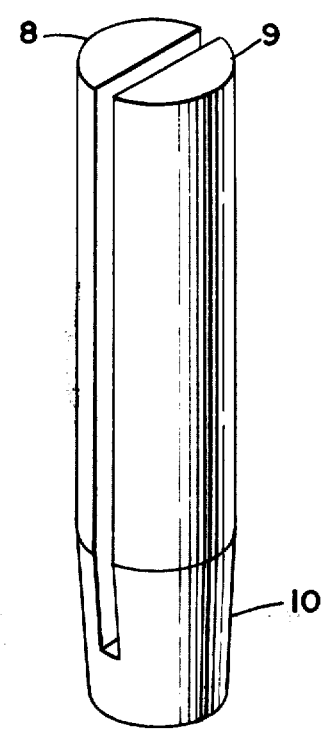
FIG. 3 is a perspective view of yet another from of electrode suitable for use in the present invention.
Figure 3A:
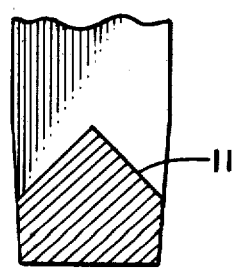
FIG. 3a is a partial elevation, in cross-section, of the electrode shown in FIG. 3.

The element shown in FIG. 3 is in the form of a solid body being centrally split along a major portion of its vertical axis. Terminal end portion 8b may be electrically connected to either of terminals 39 or 40 of the furnace with terminal 9b being connected to the other terminal. Surface 11b, shown in FIG. 3a, is also provided with an outwardly declining slope to avoid accumulation of the material being treated.

The resistance heating element should be sufficiently large to provide enough of a radiating surface area to avoid large temperature gradients within the silica charge. Likewise, thinner layers of silica, forced against the furnace liner 41 by centrifugal force, will result in lower temperature gradients within the silica mass. Large temperature gradients are to be avoided for reasons previously mentioned, e.g. generation of gaseous by-products and losses of electrode material and silica.

A tube 41 is mounted within the furnace housing 15 and is provided with a tappered inner surface which defines an interior space 34 having a configuration approximating a truncated cone. The conical configuration of the space defined by the inner surface of the tube or inner wall member 41 is such that the diameter of the interior increases gradually toward the bottom opening of the furnace and thus provides for easy and quick separation of the melt from the furnace lining or tube 41 by gravity discharge. The slope of the inner surface should be at least 1° to allow gravity discharge. The only requirement for the material forming tube 41 is that it be capable of withstanding the temperature required for completion of the fusion of silica and of sufficient chemical inertness to preclude contamination or reaction with the melt. Tube 41 is vertically supported between annular ring composite bodies 42 and 43.

The outer surface of tube 41, in conjunction with outer furnace wall 15a, define an annular space filled by an insulating material 44. The annular members 42 and 43, and the composite 44, which fills the space between the interior-exterior walls of the furnace housing are fabricated from the materials having high insulating values. Suitable insulating materials include carbon loose grains or felt, graphite loose grains or felt and zirconium loose grains or felt. Such insulating materials are superior to the unfused silica employed in the prior art devices. The interior of the furnace is provided with further insulation in the form of disc members 45 and 46 fabricated of carbon, graphite or zirconium felt. Insulating disc 45 serves to insulate and protect bottom plate or cover 19. Likewise, insulating disc 46 serves to insulate and protect the top plate or cover 26.

With the furnace insulated in this manner, a nearly complete fusion of the entire silica charge can be accomplished leaving only minute qualities of unfused silica 47 and cristobalite 48. Such small quantities do not require any special treatment for removal prior to further processing of the product.

To prevent direct contact between the resistor and the melt, the furnace is rotated about its vertical axis at a speed sufficiently fast to generate enough centrifugal force to hold the melt in place, against the lining or tube 41 and away from the resistor. The drive means includes gear means 49, reduction gears 50 and an electric motor 51.

The apparatus of the present invention further includes means to reduce and control emission of the toxic byproduct gases and thereby reduce pollution associated with the process. To this end, sealing means have been provided to render the entire furnace housing vacuum tight. Stationary vacuum seals 52 and 54 and a rotary vacuum seal 55 between the stationary top plate 26 and the rotatable furnace housing 15 have been provided. Additionally, the furnace is connected to a suitable vacuum pump 100 (see FIG. 5) which communicates with the interior of the furnace via port 58. In this manner all gases escaping from the furnace can be controlled at the exhaust port of the vacuum pump and routed to treatment means, such as gas scrubber and/or condenser means, rather than being released into the environment which the furnace is located.

Figure 5:
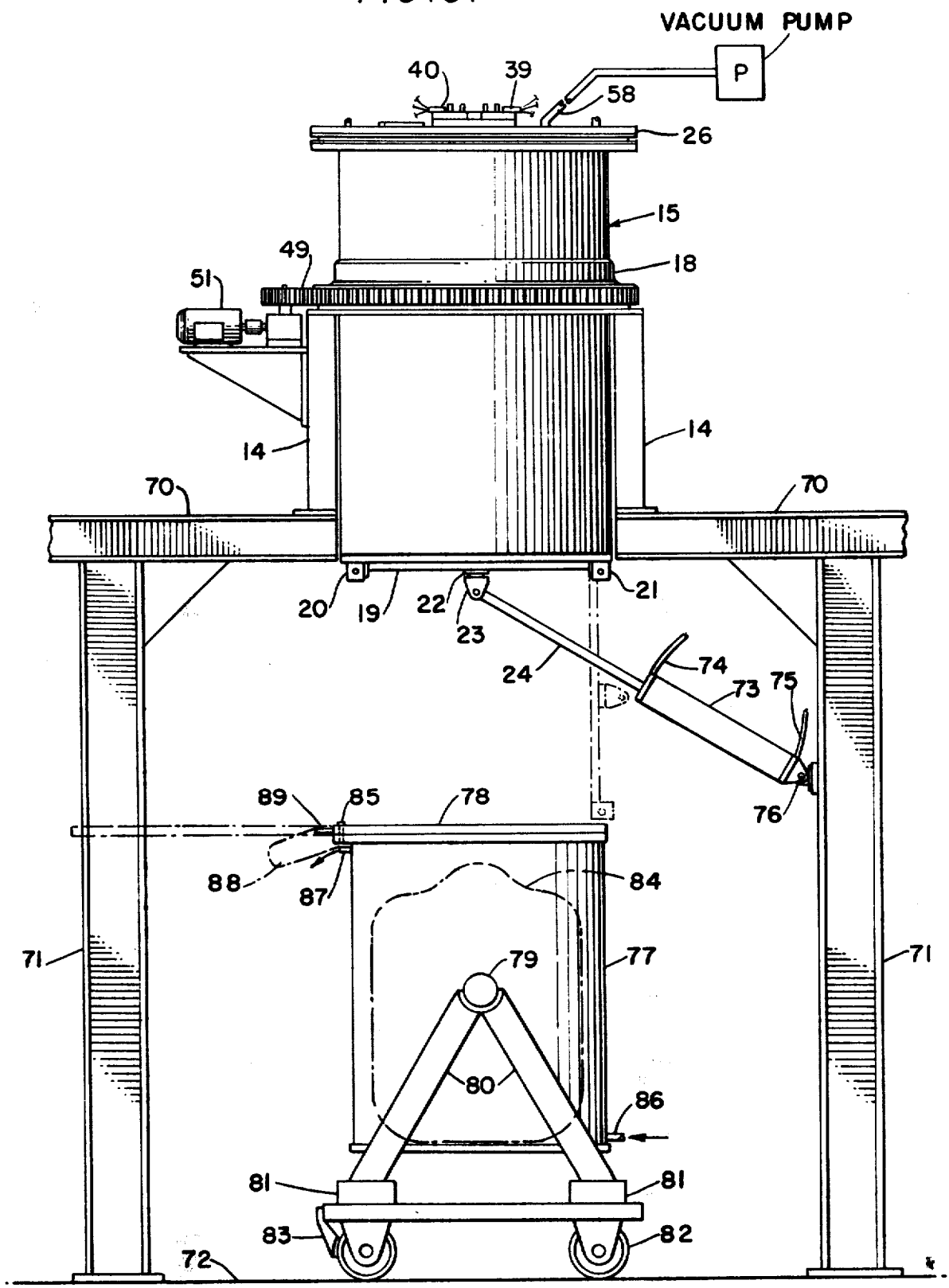
FIG. 5 is an elevational view of the apparatus of the present invention including means for collecting and quenching the amorphous silica after discharge from the furnace.

Referring now to FIG. 5, the furnace is shown mounted above the floor level 72 on a platform supported by vertically standing legs 71 and floor 70 above which the furnace arrangement as described in FIG. 4 is located. The furnace housing 15 penetrates the floor 70 as to permit gravity discharge of the melt. During operation the bottom plate or closure means 19 is in the closed position and locked in place by locking means 20. A rotating union 22 is attached to the center of the bottom plate 19, with the stationary portion of the union 23 linked to a hydraulic operating means 73 by rod member 24. The hydraulic means 35, which is linked to the bottom closure by rod 24, operates to open the bottom closure means or plate 19 to discharge the silica product at the appropriate time. The opposite end of the fluid operated cylinder 73, is attached to the vertical part of the platform 71 by way of a clevis 76. The cylinder 73 is equipped with fluid ports 74 and 75 to provide for a two way stroke, which will open and close the bottom plate as required.

Directly underneath the furnace 15 is provided a cooler or heat exchanger tank 77 for receiving and cooling the melt upon discharge from the furnace. Tank 77 rests on two side arms located in two trunnions 79. A super structure 90 is mounted in a trolley through interconnected shock absrobers 81. The trolley is equipped with suitable wheels 82 and with break shoes 83. On the top of tank 77 is a plate 78 mounted to pivot about pin 85 between open and closed positions. The purpose of the tank 77 is to cool the hot fused silica melt to minimize the time of transition through the temperature range wherein the growth rate of cristobalite is greatest, i.e 1200°-1300°C.

In order to recover a major fraction of the thermal energy contained in the melt, the tank 77 and cover plate 78 are made of a double wall construction to allow for the introduction of a heat exchange fluid which enters the tank 77 through port 85 and exits the tank via port 87. From port 87 the fluid passes into top plate 78 by way of a flexible hose connection 88 and finally, the heated fluid is removed from the entire apparatus through port 89 for further utilization.

In operation, the bottom plate 19 is closed and locked in the manner previously described. The electrical power is switched on and the furnace is preheated. The furnace is then charged with particulate crystalline silica from the pre-charged hopper 32. With grate or valve 33 open, the raw silica falls freely into the interior of the furnace, filling it to the top. When filled, the flow of silica raw materials ceases automatically and the gate is automatically shut. In this manner, only a minute quantity of raw silica within the filling pipe 31 will enter the furnace upon fusion and shrinkage of the initial charge. Optionally, the furnace may be vibrated or tapped in order to achieve the maximum filling density.

It is now believed, contrary to previous reports and findings, that the nascent melt does not separate from the resistance element due to the influence of gaseous pressure, but rather as a result of forces produced by the increase of volume in the annular section of the melt in which the silica changes into cristobalite. This effect causes the melt to continuously increase its inner diameter while the thickness of the layer of the fused silica increases accordingly.

The temperature within the furnace during the conversion process is maintained within a range from about 1728°C to about 2000°C for a period of time sufficient to effect conversion of the crystalline raw material to the amorphous state. For reasons of economics and efficient power utilization, a range of from about 1728°C to about 1900°C is preferred.

A vacuum, preferably established before start of the conversion process, is maintained throughout conversion in order to increase the insulation capacity of the furnace and to draw off the gaseous byproducts. Any degree of vacuum sufficient to accomplish these objectives is satisfactory. These objectives may be conveniently obtained with a vacuum within the range of from about 1 torr to about 300 torrs. Higher degrees of vacuum, i.e. less than 1 torr, tend to produce an unacceptable degree of volatilization of the carbon electrode and silica charge. Evacuation of the furnace during conversion results in a product essentially free from gaseous inclusions.

The speed of rotation of the furnace during the conversion process will vary in accordance with the inner diameter of the furnace used. The only criteron for the speed of rotation is that it must be sufficient to maintain the silica contents of the furnace removed from contact with the electrode. The speed of rotation of the furnace may be decreased during the conversion process because, as the silica charge melts, the diameter of the void space increases and the centrifugal force at the inner surface of the melt correspondingly increases. The rotation of the furnace forces the silica into a cylindrically shaped body, which stays clear of the stationary resistance element, thus avoiding friction and abrasion of the element.

In one embodiment, rotation of the furnace is started only after the silica charge has been heated sufficiently to effect melting and subsequent separation from the centrally located electrode. In another embodiment, charging of the furnace is accomplished by means of the apparatus depicted in FIG. 6, which employs the water cooled filling tube or pipe 66. In this second filling procedure, rotation of the furnace is started prior to filling and the filling tube or pipe 66 is initially inserted to a point near the bottom of the furnace. The filling tube is then gradually withdrawn from the rotating furnace, the speed of withdrawal being regulated to deposit a uniform layer of raw silica along the interior vertical surface of the furnace. Since the filling of the furnace proceeds with considerable speed, it is feasible to start up the resistor or electrode while the filling operation is in progress. For furnaces of a larger inner diameters, i.e. 4 feet and larger, the volume of the charge of silica raw material cannot be increased in proportion to the large interior space provided by the furnace without creation of intolerably large temperature gradients across the wall of the fused silica melt. In such large furnaces, the first mentioned procedure for charging the furnace is inappropriate. The second mentioned filling procedure employing the movable filling tube serves to limit the vertical layer or charge of raw material to a thickness smaller than the distance between the furnace liner 41 and the electrode 36.

The time required for conversion to the amorphous state will vary in accordance with the nature of the heating element and the volume of the furnace. Accordingly, a suitable time must be determined experimentally in conjunction with the use of a given apparatus.

After heating at a temperature and for a time sufficient to convert the entire silica mass to amorphous state, power to the electrode or heating element 36 is discontinued to allow the furnace to gradually cool. During this initial cooling period rotation of the furnace is continued to prevent the silica melt from collapsing and coming into contact with the carbon electrode. The charge is retained in the rotating furnace until cooled to a temperature within the range of 1300°–1400°C.

After cooling to a temperature within the range of 1300°–1400°C, the melt is ready to be discharged for more rapid cooling. At a temperaure within the range of 1300°–1400°C the silica mass becomes sufficiently rigid to retain its shape so that it will not collapse and come in contact with the carbon electrode but still has not cooled to a temperature range wherein the maximum growth rate of cristobalite occurs, i.e. 1200°–1300°C. At this point in time, the rotation of the furnace may be stopped and the vacuum pump may also be turned off. The discharge of the hot silica mass must be as rapid as possible to minimize the formation of cristobalite. Gravity is a preferred means for discharge. Gravity discharge is easily effected using the apparatus and vertical arrangement depicted in FIG. 5. The conical shape of the interior of the furnace, previously described, aids in obtaining a rapid release of the silica mass from the furnace.

After the rotation of the furnace has ceased, the furnace is oriented in a position which permits the opening of the bottom plate 19 by means of actuation of the hydraulic means 73, following the release of the lock 20. The melt will leave the furnace under the influence of its own weight in a fraction of a second and drop into tank 77. FIG. 5 shows the solidified silica 84 within tank 77. Immediately thereafter, a reverse stroke of the clinder closes the bottom plate 19 again, thus retaining an appreciable amount of thermal energy within the furnace. Likewise, the top plate 78 of the tank 77 is closed.

The batch type operation described above has been found to be more efficient with regard to conserving energy than prior art continuous processes. Continuous processes are rather limited in this respect because of the inevitable flow of heat through the mass of fused silica which is continuously extruded from the furnace.

It will be appreciated from the foregoing that the furnace heat recovery means of the present invention includes both hollow top plate 26 and hollow bushing or connector 35. The heat recovery means associated with quench tank includes both the hollow wall construction of the tank proper and the lid 78.

It should be obvious from the foregoing description. that the loading and unloading of the furnace is accomplished in a simple and inexpensive manner, exclusive of sophisticated mechanical means.

The following example is provided to further describe a preferred embodiment of the present invention.

Example

Two tons of silica sand having a grain size of minus 30 mesh is introduced into a furnace of a design corresponding to that of FIG. 4 and FIG. 5. The time required to load the furnace by gravity feed is less than 15 minutes. The furnace is equipped with a resistance element having an outer diameter of 5.25 inches, a length of 108 inches, and manufactured from standard graphite stock in accordance with the design of FIG. 2. The resistance of this heating element is approximately 0.08 ohms. A single phase transformer providing 500 kVA at 200 volts and 2,500 ampheres is used as the power supply.

Because the thermal inertia of the above-described electrode is small, fused temperatures are reached in less than ten minutes after turning on the power. Thirty minutes after turning on the power supply, the melt is sufficiently separated from the resistance element and rotation of the furnace is started. The time required to complete fusion of the silica charge is approximately three hours (being dependent on the size of the charge, the nature of the insulation, and the heat input).

The furnace employed in this experiment is a nominal 3 foot diameter furnace having an interior 130 inches in length and gradually sloped from a 27 inch I.D. at the top to a 30 inch I.D. bottom opening.

At the outset of the run the pressure in the interior of the furnace is reduced to approximately 1 torr. During the course of the 3 hour conversion process, the pressure gradually increases to approximately 300 torrs due to the increased vapor pressure of the contents of the furnace. The speed of rotation of the furnace is initially 220 rpm and is gradually reduced over the span of the 3 hour run to 150 rpm. Given the mass of the silica, furnace dimensions, and power input employed here, the temperature at the interior surface of the melt is approximately 1880°C and the temperature at the outer surface of the melt, adjacent to the interior wall of the furnace liner, is approximately 1730°C.

At the end of the 3 hour period the motor rotating the furnace is shut down and the vacuum pump turned off. The silica charge is then allowed to cool in the closed furnace to a temperature of approximately 1350°C. The silica charge is then instantly dropped into the empty cooler. Water at room temperature is circulated through the jacket of the cooler.

Upon examination of the fused material, it will be found that there is virtually no contamination with regard to residual alpha-quartz, cristobalite, graphite or silica. Furthermore, it will be found that the density of the fused silica will be approximately 2.2 grams/cc (lower quality raw materials will result in a corresponding decrease in the density of the product). As a result of the use of vacuum, a good portion of the silica product is completely transparent and therefore comparable to high purity fused silicas which are usually prepared in much smaller batches and at much smaller rates per hour.

The results outlined in the foregoing example correspond to a production rate of approximately 1200 pounds per hour, including the time required for loading and discharging of the furnace. This production rate is higher than those reported for "continuous" melters of corresponding size. It is feasible to obtain even higher production rates since much larger elements and larger furnaces than that described above are technically feasible. The consumption of electrical energy in the example described above is favorably low in comparison with the power consumption rates for prior art batch and continuous melters, i.e. approximately 0.4 kilowatt hours per pound of fused silica.

As can be appreciated from the foregoing, the operation described above may be considered "quasi-continuous" since the time for loading and discharging the furnace is short as compared to the fusion time. The output obtained in the above described manner when projected into a cycle time for complete runs indicates a higher hourly rate than for a so-called continuous process. In this connection it should be noted that the so-called continuous melter is actually quasi-continuous since such melters do not allow for the continuous removal of the melt.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for the fusing of a particulate material comprising:
    a furnace housing comprising a generally cylindrical body portion, said body portion having an interior surface defining an interior space of a configuration approximating a truncated cone, said body portion further provided with at least two openings for access to said space, one of said openings forming the base of said truncated cone;
    means for charging the particulate crystalline silica through one of said openings into said space;
    resistance heating means secured to said furnace housing and extending into said space;
    means for rotating said body portion about the longitudinal axis of said cone;
    cover means for closing said opening at said base; and
    mounting means for attaching said cover means to furnace housing and for movement of said cover means between open and closed positions.

2. The apparatus of claim 1 wherein said charging means is a tube slideably mounted in said housing for introducing a charge of particulate material along a vertical wall of the furnace during rotation.

3. The apparatus of claim 1 additionally comprising means for evacuating said interior space.

4. The apparatus of claim 3 additionally comprising heat recovery means.

5. The apparatus of claim 1 wherein said interior surface of said body portion is sloped at least 1°.

* * * * *